(12) United States Patent
Cheung (10) Patent No.: US 10,533,502 B2
(45) Date of Patent: Jan. 14, 2020

(54) COMBUSTOR FUEL MANIFOLD

(71) Applicant: UNITED TECHNOLOGIES CORPORATION, Farmington, CT (US)

(72) Inventor: Albert K. Cheung, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 334 days.

(21) Appl. No.: 15/478,104

(22) Filed: Apr. 3, 2017

(65) Prior Publication Data

US 2018/0283285 A1 Oct. 4, 2018

(51) Int. Cl.
| | | |
|---|---|---|
| *F02C 9/26* | (2006.01) | |
| *F02C 7/22* | (2006.01) | |
| *F02C 7/232* | (2006.01) | |
| *F02C 7/264* | (2006.01) | |
| *F02C 9/32* | (2006.01) | |
| *F02C 3/04* | (2006.01) | |

(52) U.S. Cl.
CPC ............... *F02C 9/26* (2013.01); *F02C 7/222* (2013.01); *F02C 7/232* (2013.01); *F02C 7/264* (2013.01); *F02C 9/263* (2013.01); *F02C 9/32* (2013.01); *F02C 3/04* (2013.01); *F05D 2220/32* (2013.01); *F05D 2240/14* (2013.01); *F05D 2240/35* (2013.01); *F05D 2270/092* (2013.01)

(58) Field of Classification Search
CPC .... F02C 9/26; F02C 9/263; F02C 9/32; F02C 7/22; F02C 7/222; F02C 7/228; F02C 7/232; F23R 3/28; F23R 3/34
See application file for complete search history.

(56) References Cited

U.S. PATENT DOCUMENTS 3,775,975 A * 12/1973 Stenger ............... F02C 7/20
60/798
4,903,478 A * 2/1990 Seto ................ F02C 7/222
60/39.281

(Continued)

FOREIGN PATENT DOCUMENTS

EP 1367325 12/2003

OTHER PUBLICATIONS

European Patent Office, European Search Report dated Aug. 8, 2018 in Application No. 18154918.9-1007.

*Primary Examiner* — Steven M Sutherland
(74) *Attorney, Agent, or Firm* — Snell & Wilmer L.L.P.

(57) ABSTRACT

A gas turbine engine may include a fuel manifold extending circumferentially around a diffuser case of the gas turbine engine. The fuel manifold may include a fuel supply inlet interface for receiving fuel into the fuel manifold and a plurality of fuel delivery outlet interfaces for delivering fuel to a combustor of the gas turbine engine. The gas turbine engine may also include a valve coupled to the fuel manifold. The valve may be configured to control fuel distribution in the fuel manifold. The valve may be disposed between two fuel delivery outlet interfaces of the plurality of fuel delivery outlet interfaces. The valve may be configured to at least decrease fuel flow to one of the plurality of fuel delivery outlet interfaces. The valve may be configured to at least decrease fuel flow to half of the plurality of fuel delivery outlet interfaces.

13 Claims, 8 Drawing Sheets

(56) References Cited

U.S. PATENT DOCUMENTS

| | | | | |
|---|---|---|---|---|
| 5,390,498 | A * | 2/1995 | Sulkin | F02C 7/222 |
| | | | | 60/739 |
| 6,968,699 | B2 * | 11/2005 | Howell | F23R 3/343 |
| | | | | 60/739 |
| 8,037,688 | B2 | 10/2011 | Hagen et al. | |
| 8,037,690 | B2 * | 10/2011 | Morenko | F02C 7/222 |
| | | | | 60/39.094 |
| 8,631,656 | B2 | 1/2014 | Danis et al. | |
| 8,776,529 | B2 | 7/2014 | Paradise | |
| 9,255,711 | B2 | 2/2016 | Crothers et al. | |
| 9,551,283 | B2 | 1/2017 | Crothers et al. | |
| 2006/0080961 | A1 * | 4/2006 | Paradise | F02C 7/228 |
| | | | | 60/734 |
| 2007/0039329 | A1 | 2/2007 | Abreu et al. | |
| 2008/0072605 | A1 | 3/2008 | Hagen et al. | |
| 2012/0102914 | A1 | 5/2012 | Kirzhner et al. | |
| 2016/0195024 | A1 | 7/2016 | Hoke et al. | |

\* cited by examiner

COMBUSTOR FUEL MANIFOLD

GOVERNMENT LICENSE RIGHTS

This disclosure was made with government support under Contract No. FA 8650-09-D-2923 awarded by the United States Air Force. The government has certain rights in the disclosure.

FIELD

The present disclosure relates to gas turbine engines, and more specifically, to fuel manifolds for combustors of gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Fuel is delivered to the combustor section of a gas turbine engine via fuel nozzle supply tubes. The fuel nozzle supply tubes can receive fuel from a fuel source via a fuel manifold. In response to changes in the operating line of the gas turbine engine, such as a sudden deceleration request from a user, the combustor section can experience flame extinguishment due to low a fuel-air ratio, an event which may be referred to as "lean blowout." Lean blowout potentially poses a significant hazard to the operation of the aircraft. Additionally, a combustor section can also be susceptible to tangential acoustics in response to changes in the operating line of the engine, which can have detrimental results for the gas turbine engine.

SUMMARY

In various embodiments, the present disclosure provides a gas turbine engine. The gas turbine engine may include a fuel manifold extending circumferentially around a diffuser case of the gas turbine engine, the fuel manifold having a fuel supply inlet interface for receiving fuel into the fuel manifold and a plurality of fuel delivery outlet interfaces for delivering fuel to a combustor of the gas turbine engine. The gas turbine engine may further include a valve coupled to the fuel manifold and disposed between two adjacent fuel delivery outlet interfaces of the plurality of fuel delivery outlet interfaces, wherein the valve is configured to control fuel distribution in the fuel manifold.

In various embodiments, the fuel manifold is a continuous loop. In various embodiments, the valve is configured to at least decrease fuel flow to one of the plurality of fuel delivery outlet interfaces. In various embodiments, the valve is configured to at least decrease fuel flow to a portion of the plurality of fuel delivery outlet interfaces. In various embodiments, the valve is configured to divide the fuel manifold into at least one fuel flow circumferential section and at least one fuel limited circumferential section. In various embodiments, the gas turbine engine further includes an igniter coupled in ignition providing communication with the combustor, wherein the igniter is circumferentially positioned adjacent to the at least one fuel flow circumferential section of the fuel manifold. In various embodiments, the fuel manifold is a continuous loop and the valve is a first valve, the gas turbine engine further comprising a second valve, wherein the first valve and the second valve are configured to control fuel distribution in the fuel manifold. The first valve and the second valve may be configured to divide the fuel manifold into a fuel flow circumferential section and a fuel limited circumferential section.

In various embodiments, the fuel manifold is a non-continuous loop that includes a first branch extending in a first circumferential direction from the fuel supply inlet interface and terminating at a first end portion and a second branch extending a second circumferential direction from the fuel supply inlet interface and terminating at a second end portion. The valve may be a first valve and the gas turbine engine may further include a second valve, wherein the first valve is coupled to the first branch of the fuel manifold and the second valve is coupled to the second branch of the fuel manifold. The second branch of the fuel manifold may include a bend, wherein the second branch extends in the first circumferential direction from the bend. The first valve and the second valve may be configured to divide the fuel manifold into two fuel flow circumferential sections and two fuel limited circumferential sections. The two fuel flow circumferential sections may be separated by the two fuel limited circumferential sections, and vice versa. In various embodiments, the valve is actively controlled by an engine electrical control unit.

Also disclosed herein, according to various embodiments, is a gas turbine engine the gas turbine engine may include a combustor, an igniter coupled in ignition providing communication with the combustor, and a fuel manifold comprising a fuel supply inlet interface for receiving fuel into the fuel manifold and a plurality of fuel delivery outlet interfaces for delivering fuel to the combustor of the gas turbine engine. The fuel manifold may include a first branch extending in a first circumferential direction from the fuel supply inlet interface and terminating at a first end portion and a second branch extending a second circumferential direction from the fuel supply inlet interface and terminating at a second end portion. The second branch of the fuel manifold includes a bend, wherein the second branch extends in the first circumferential direction from the bend. The gas turbine engine may further include a first valve coupled to the first branch of the fuel manifold and a second valve coupled to the second branch of the fuel manifold. The first valve and the second valve may be configured to divide the fuel manifold into two fuel flow circumferential sections and two fuel limited circumferential sections. In various embodiments, the two fuel flow circumferential sections are separated by the two fuel limited circumferential sections, and vice versa.

Also disclosed herein, according to various embodiments, is a method of controlling a gas turbine engine. The method includes determining, by a controller, an engine operating line of the gas turbine engine, controlling, by the controller and via at least one valve coupled to a fuel manifold, fuel distribution in the fuel manifold, according to various embodiments. In various embodiments, controlling fuel distribution in the fuel manifold includes dividing, by the controller and via the at least one valve, the fuel manifold into at least one fuel flow circumferential section and at least one fuel limited circumferential section. In various embodiments, controlling fuel distribution in the fuel manifold comprises dividing, by the controller and via the at least one valve, the fuel manifold into two fuel flow circumferential sections and two fuel limited circumferential sections. In various embodiments, controlling fuel distribution via the at least one valve comprises controlling a position of a stem of the valve.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Figure 1:
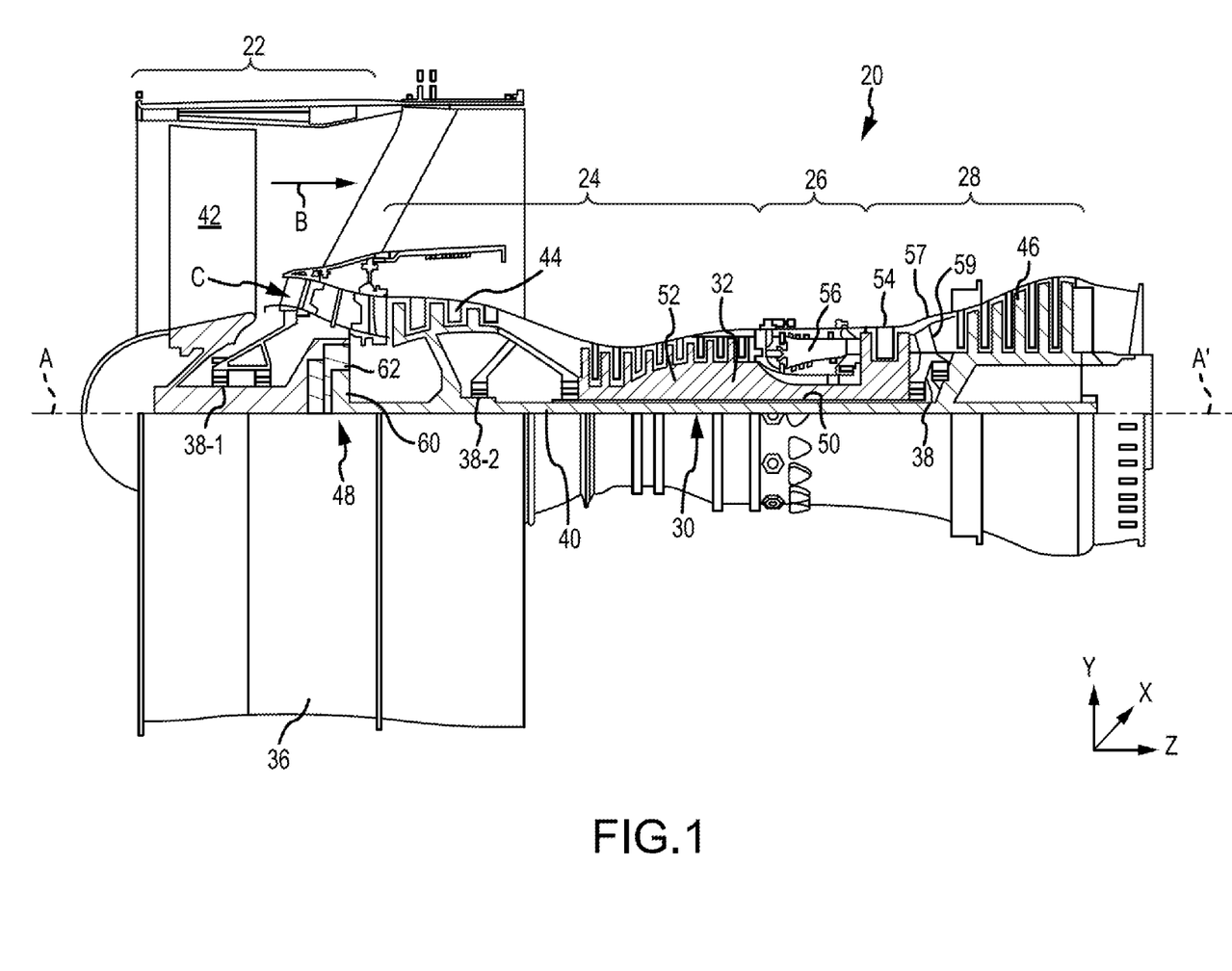
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
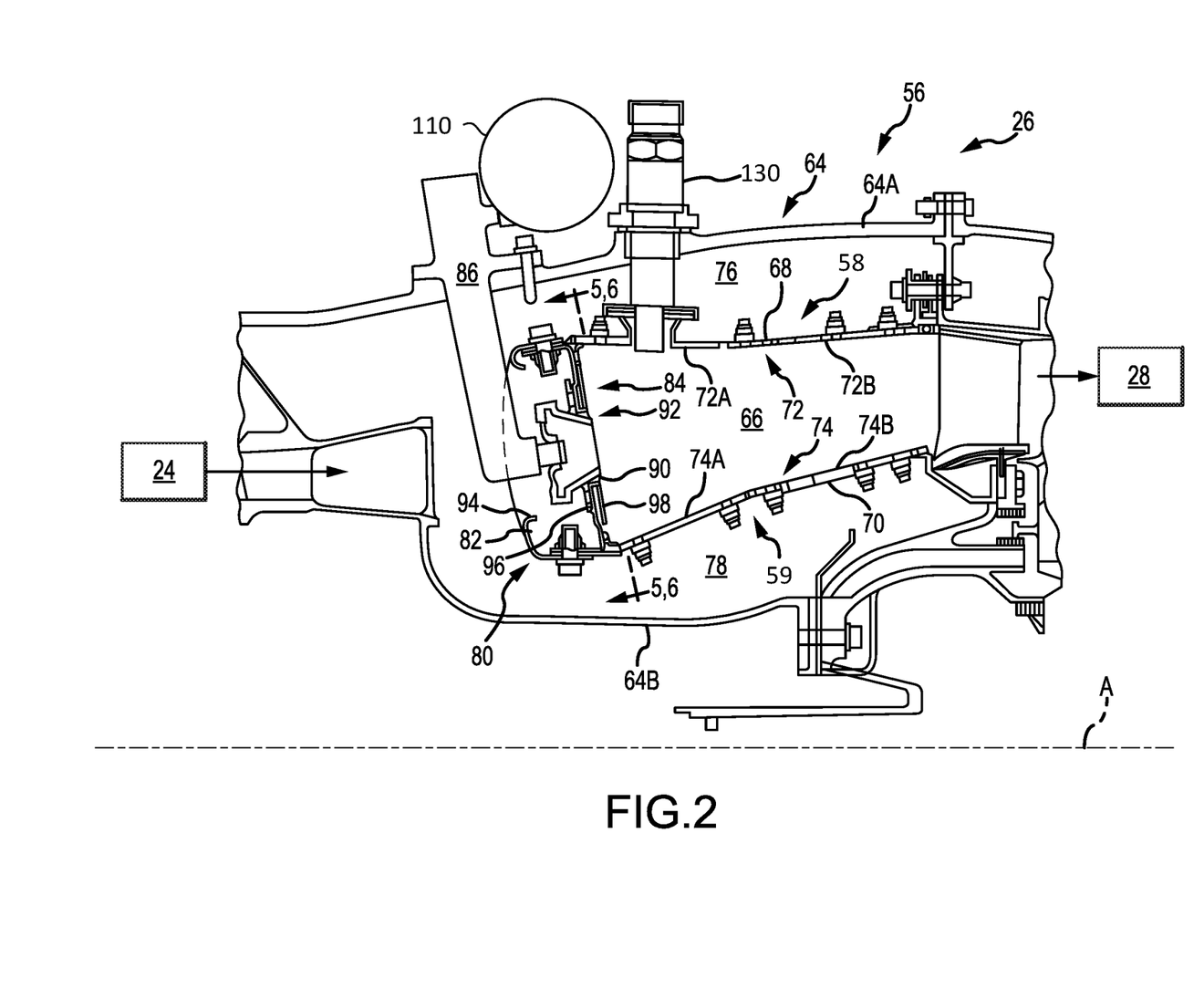
FIG. 2 illustrates a cross-sectional view of a combustor section of gas turbine engine, in accordance with various embodiments.

Referring to FIG. 2, the combustor section 26 generally includes a combustor 56 with an outer combustor wall assembly 58, an inner combustor wall assembly 59 and a diffuser case 64 that encases assemblies 58, 59. The outer combustor wall assembly 58 and the inner combustor wall assembly 59 are radially spaced apart such that an annular combustion chamber 66 is defined therebetween, in accordance with various embodiments.

In various embodiments, the outer combustor wall assembly 58 is spaced radially inward from an outer diffuser case wall 64A of the diffuser case 64 to define an outer annular plenum 76. In various embodiments, the inner combustor wall assembly 59 is spaced radially outward from an inner diffuser case wall 64B of the diffuser case 64 to define an inner annular plenum 78. It should be understood that although a particular combustor is illustrated, other combustor types with various combustor liner arrangements can be implemented herein.

The combustion chamber 66 generally may contain the combustion products (e.g., combustion gases) that flow axially toward the turbine section 28. Each combustor wall assembly 58, 59 generally includes a respective support shell 68, 70 that supports one or more liners 72, 74 mounted thereto. Each of the liners 72, 74 may be formed of a plurality of floating heat shields or panels that are generally rectilinear and manufactured of, for example, a nickel based super alloy that may be coated with a ceramic, or other temperature resistant material, and are arranged to form a liner array. Each liner may have a plurality of forward panels 72A and a plurality of aft panels 72B that line the outer shell 68. A plurality of forward panels 74A and a plurality of aft panels 74B also line the inner shell 70. At least one igniter 130 is generally located at and projects through the forward panel 72A to initially ignite a blended fuel-air mixture. It should be appreciated that the liner array may alternatively include but a single panel rather than the illustrated axial forward and axial aft panels.

The combustor 56 may further include a forward assembly 80 immediately downstream (e.g., aft) of the compressor section 24 to receive compressed airflow therefrom. The forward assembly 80 generally includes an annular hood 82, a bulkhead assembly 84, and a plurality of swirlers 90 (one shown) that are circumferentially spaced from one-another. Each swirler 90 is circumferentially aligned with one of a plurality of fuel nozzle supply tubes 86 (one shown) and a respective one of a plurality of hood ports 94, according to various embodiments. In various embodiments, the bulkhead assembly 84 includes a bulkhead support shell 96 secured to the combustor walls 58, 59, and a liner that may have a plurality of circumferentially distributed bulkhead heat shields or panels 98 secured to the bulkhead support shell 96 around each of a respective swirler opening 92. The bulkhead support shell 96 may be generally annular and the plurality of circumferentially distributed bulkhead panels 98 may be segmented, typically one to each fuel nozzle supply tube 86 and swirler 90.

As described in greater detail below, fuel may be delivered to each fuel nozzle supply tube 86 via a fuel manifold 110. In various embodiments, the fuel manifold 110 extends circumferentially around the diffuser case 64 of the gas turbine engine. The fuel manifold 110 may be disposed radially outward of and may be mounted to the outer diffuser case wall 64A of the diffuser case 64.

In various embodiments, the annular hood 82 extends radially between, and is secured to, the forwardmost ends of the combustor wall assemblies 58, 59. Each one of the plurality of circumferentially distributed hood ports 94 may receive a respective one of the plurality of fuel nozzle supply tubes 86 and may facilitate the direction of compressed air into the forward end of the combustion chamber 66 through the swirler opening 92. Each fuel nozzle supply tube 86 may be secured to the diffuser case 64 and may project through one of the hood ports 94 into the respective swirler opening 92. The forward assembly 80 generally introduces core combustion air into the forward section of the combustion chamber 66 while the remainder of the air enters the outer annular plenum 76 and the inner annular plenum 78. The plurality of fuel nozzle supply tubes 86 and adjacent structure generate the blended fuel-air mixture that supports stable combustion in the combustion chamber 66, according to various embodiments.

Figure 3:
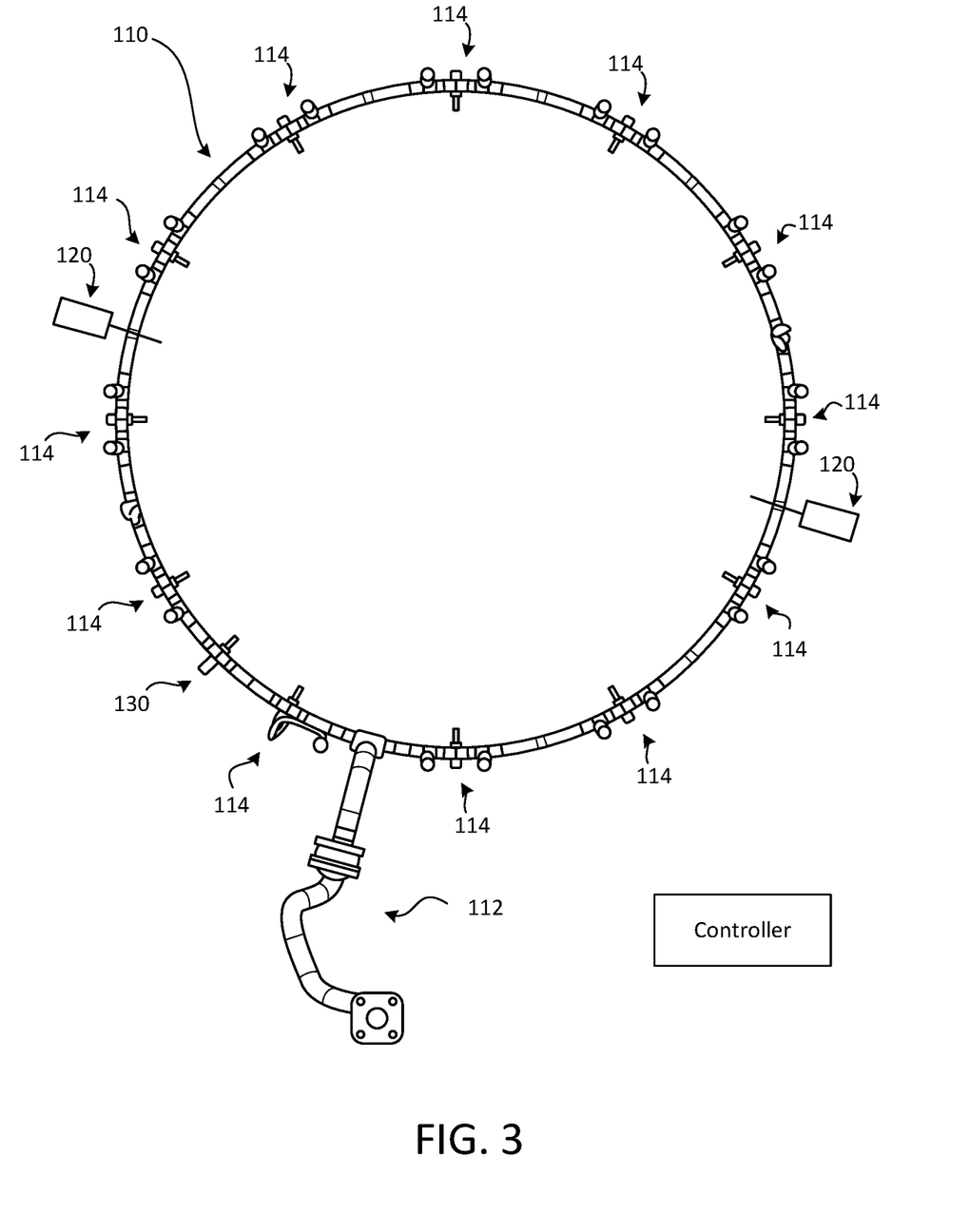
FIG. 3 illustrates a perspective view of a fuel manifold of a gas turbine engine, in accordance with various embodiments.

In various embodiments, and with reference to FIG. 3, the fuel manifold 110 is ring manifold (e.g., a continuous loop manifold). The fuel manifold 110 may have a fuel supply inlet interface 112 for receiving fuel from a fuel source. The fuel manifold 110 may also include a plurality of fuel delivery outlet interfaces 114 for delivering fuel to the combustor 56 of the gas turbine engine 20 via the fuel nozzle supply tubes 86 (with momentary reference to FIG. 2). In various embodiments, the plurality of fuel delivery outlet interfaces 114 refer to connection locations for the fuel nozzle supply tubes 86. While 8 fuel delivery outlet interfaces 114 are shown in the figures, the fuel manifold 110 may include more or less fuel delivery outlet interfaces.

In various embodiments, the plurality of fuel delivery outlet interfaces 114 are circumferentially distributed around the fuel manifold 110 to enable fuel to be substantially uniformly and circumferentially distributed and delivered to the combustor 56 in response to a nominal operating line (e.g., condition) of the gas turbine engine. However, as mentioned above, in response to changes in the requested operating line of the engine, such as a sudden deceleration request from a user (commonly referred to as "snap decel"), the pressure and/or flow of fuel in a conventional fuel manifold would be decreased, which could potentially result in a lean blowout or detrimental tangential acoustics (described in greater detail below) within the combustor section 26 of the gas turbine engine 20. In various embodiments, however, the fuel manifold 110 provided herein includes one or more valves 120 that are configured to control fuel distribution in the fuel manifold. The one or more valves 120 disclosed herein are solenoid valves, according to various embodiments. The one or more valves 120 may be separate and independent from any flow metering devices coupled to the fuel nozzle supply tubes 86.

In various embodiments, for example, the valve 120 may be disposed between two adjacent fuel delivery outlet interfaces of the plurality of outlet interfaces 114. The valve 120 may be configured to at least decrease fuel flow, by decreasing fuel flow rate or decreasing fuel pressure, to one of the plurality of fuel delivery outlet interfaces 114. The valve(s) 120, in various embodiments, is configured to at least decrease fuel flow to half of the plurality of fuel delivery outlet interfaces 114. For example, the valve can be configured to divide the fuel manifold into at least one fuel flow circumferential section and at least one fuel limited circumferential section, as described in greater detail below, according to various embodiments. That is, the valve 120 may be actively controlled and actuated, by a controller, to either limit or completely restrict fuel to certain portions (i.e., "fuel limited circumferential sections") of the fuel manifold 110, thereby allowing other portions (i.e., "fuel flow circumferential sections") of the fuel manifold 110 to maintain an adequate flow rate and/or pressure of fuel to prevent lean blowout.

In various embodiments, and with continued reference to FIG. 2, the gas turbine engine 20 includes an igniter 130 coupled in ignition providing communication with the combustor 56. The igniter may be circumferentially positioned adjacent to the at least one fuel flow circumferential section of the fuel manifold 110. That is, the valve 120 may be configured to maintain an adequate pressure/flow of fuel in the portion of the fuel manifold 110 that has a fuel delivery outlet interface that delivers fuel to a location within the combustion chamber 66 that is in close proximity to the igniter 130 (with momentary reference to FIG. 2).

As mentioned, the valve 120 is configured to be actively controlled, by a controller, in response to a determined engine operating line (e.g., a request by a user for a specific engine operating condition at any combination of altitude and Mach number of the aircraft), according to various embodiments. The controller may be integrated into one or more computer systems onboard aircraft such as, for example, an engine electronic controller (e.g., an engine electronic control unit) or a full authority digital engine control (FADEC), among others. Accordingly, the valve 120 is not passively actuated in response to, for example, a fuel pressure in the fuel manifold 110, in accordance with various embodiments. Instead, the valve 120 can actively control the fuel pressure within the fuel manifold 110, thereby preemptively changing the flow configuration and pressure properties of the fuel within the fuel manifold 110 to prevent or reduce the likelihood of lean blowout, in accordance with various embodiments.

Figure 4:
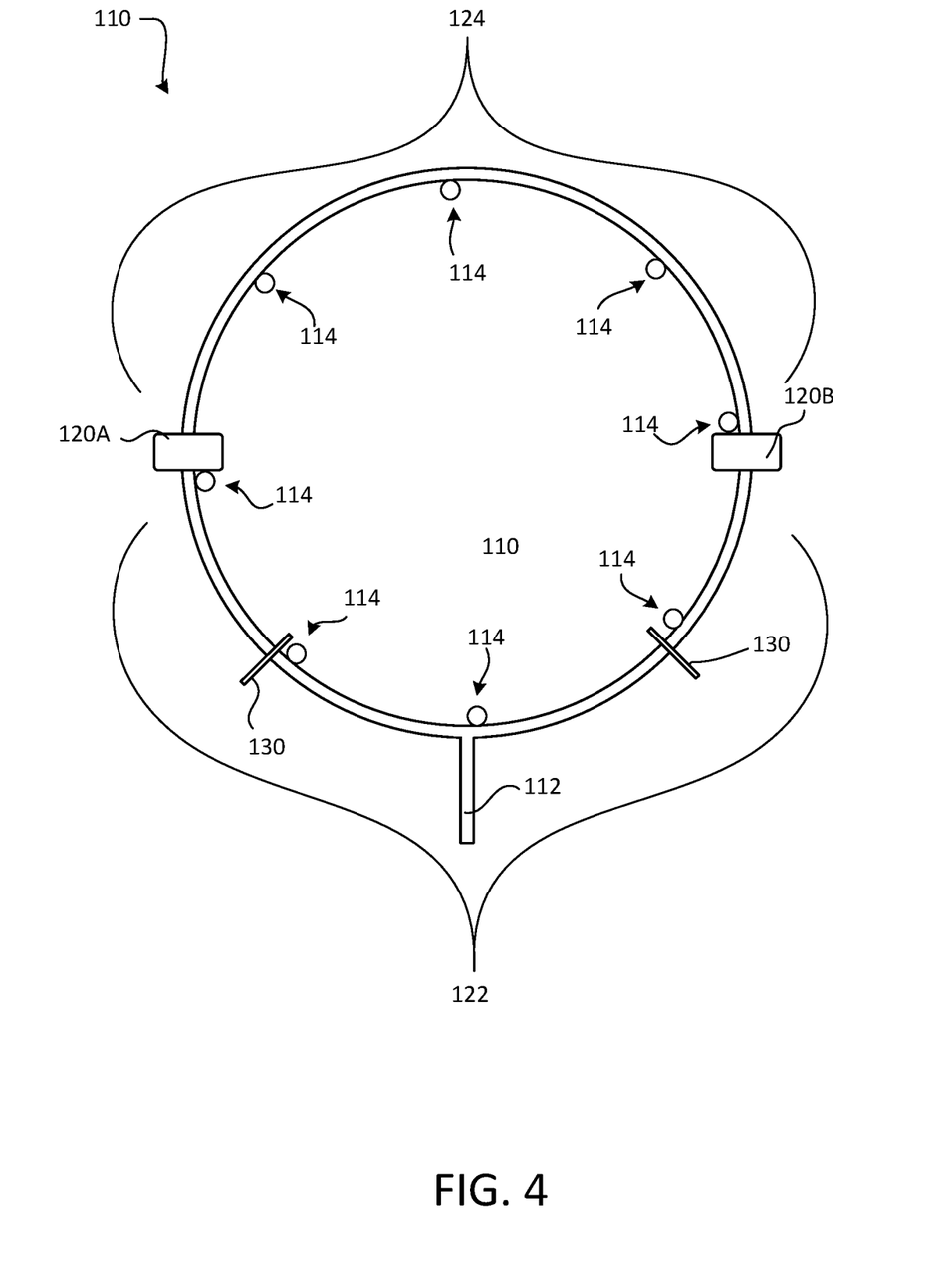
FIGS. 4, 5, 6 and 7 illustrate schematic views of a fuel manifold of a gas turbine engine, in accordance with various embodiments.

In various embodiments, and with reference to FIGS. 3 and 4, the fuel manifold 110 is a continuous loop. Said differently, the fuel manifold 110 may be a ring that extends completely circumferentially around the combustor 56 and may not have any end portions or terminating portions. The gas turbine engine may include two valves, a first valve 120A and a second valve 120B. The first valve 120A and the second valve 120B are configured to be actively actuated to control fuel distribution in the fuel manifold 110. For example, the first valve 120A and the second valve 120B may actuate respective stems that partially block or completely block fuel flow, thereby dividing the fuel manifold 110 into a fuel flow circumferential section 122 and a fuel limited circumferential section 124. Accordingly, the fuel flow circumferential section 122 may have adequate fuel flow/pressure, at the expense of the low or insufficient fuel flow/pressure within the fuel limited circumferential section 124, to maintain combustion burn within the combustor 56 (momentary reference to FIG. 2) via the fuel delivery outlet interfaces 114 that are disposed and coupled to the fuel flow circumferential section 122, in accordance with various embodiments.

Figure 5:
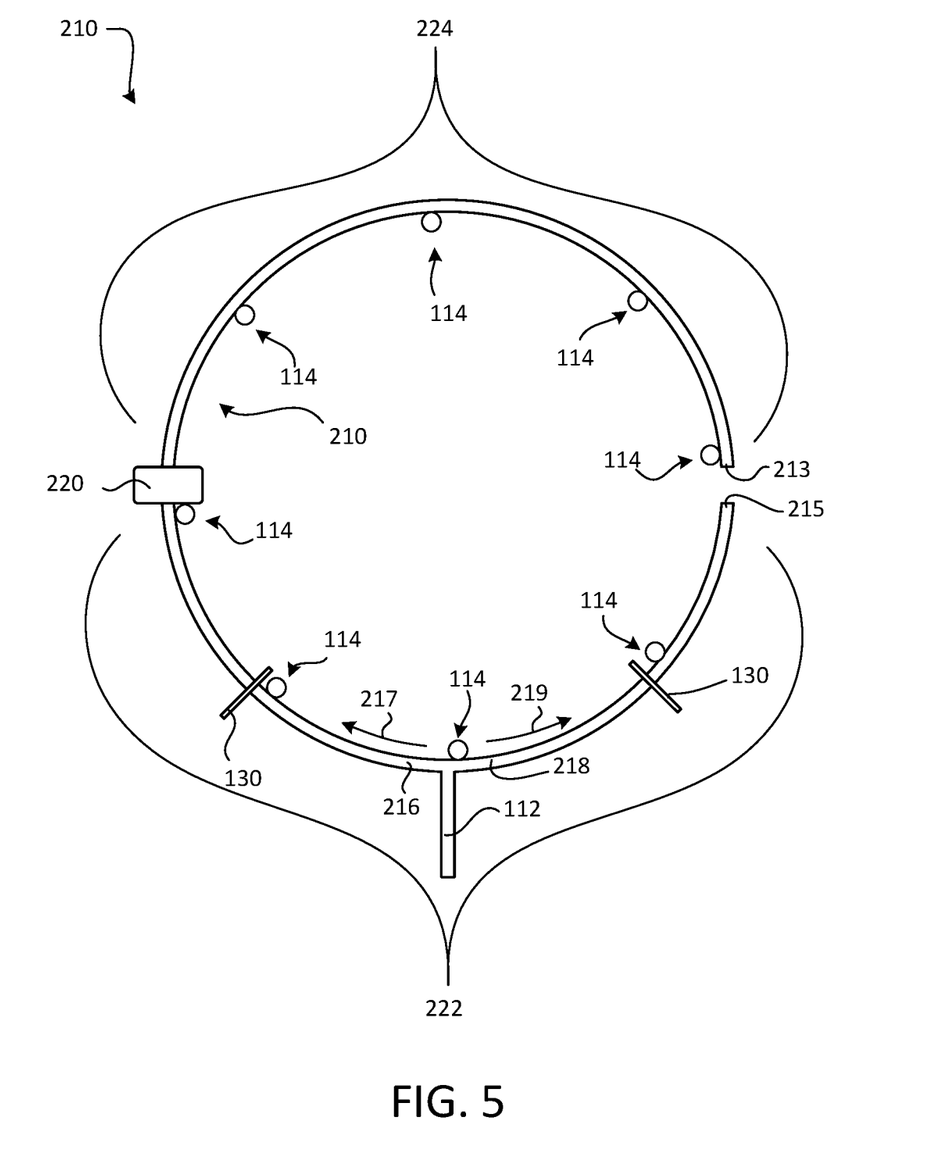

In various embodiments, and with reference to FIG. 5, the fuel manifold 210 is a non-continuous loop that includes a first branch 216 extending in a first circumferential direction 217 from the fuel supply inlet interface 112 that terminates at a first end portion 213. The fuel manifold 210 also includes a second branch 218 extending in a second circumferential direction 219 from the fuel supply inlet interface 112 that terminates at a second end portion 215. In various embodiments, the assembly may include a single valve 220 that controls the flow and/or pressure distribution of fuel in the fuel manifold 210. For example, the valve 220 may be configured to be actuated to partially block or completely block fuel flow, thereby dividing the fuel manifold 210 into a fuel flow circumferential section 222 and a fuel limited circumferential section 224. That is, the valve 220 may actuate to maintain adequate fuel pressure in the portion of the first branch 216 between the fuel supply inlet interface 112 and the valve 220 and in the portion of the second branch 218 between the fuel supply inlet interface 112 and the second end portion 215 (i.e., the fuel flow circumferential section 222) while fuel pressure is limited or restricted in the portion of the first branch 216 between the valve 220 and the first end portion 213 (i.e., the fuel limited circumferential section 224).

Figure 6:
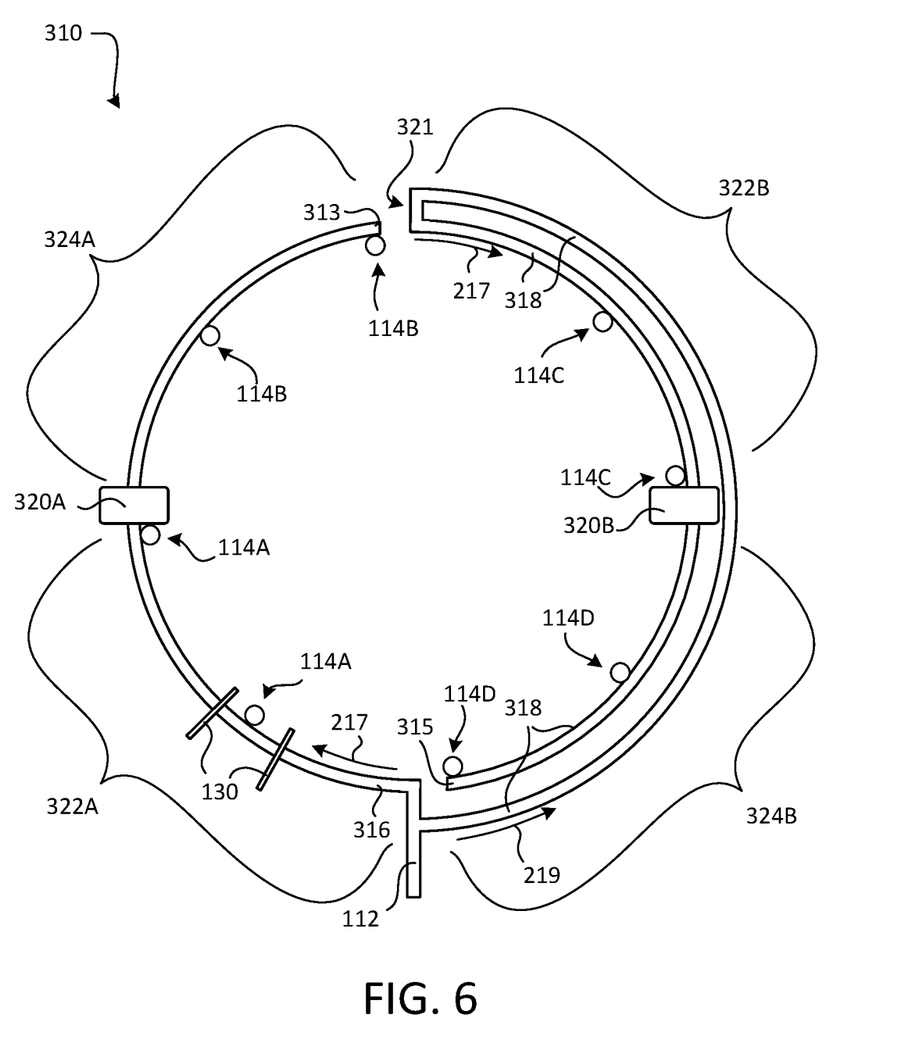

In various embodiments, and with reference to FIG. 6, the fuel manifold 310 is a non-continuous loop that includes a first branch 316 extending in a first circumferential direction 217 from the fuel supply inlet interface 112 that terminates at a first end portion 313. The fuel manifold 310 also includes a second branch 318 extending in a second circumferential direction 219 from the fuel supply inlet interface 112 that terminates at a second end portion 315. The second branch 318 may include a bend 321 such that a portion of the second branch 318 extends in the first circumferential direction 217 from the bend 321. In various embodiments, the assembly may include a first valve 320A and a second valve 320B. The first valve 320A and the second valve 320B may be configured to divide the fuel manifold 310 into two fuel flow circumferential sections 322A, 322B and two fuel limited circumferential sections 324A, 324B. That is, the first valve 320A may be configured to partially or completely block fuel flow, thereby maintaining adequate fuel pressure and/or flow within the portion of the first branch 316 between the first valve 320A and the fuel supply inlet interface 112 (i.e., the first fuel flow circumferential section 322A) and limiting or restricting the fuel pressure and/or flow within the portion of the first branch 316 between the first valve 320A and the first end portion 313 (i.e., the first fuel limited circumferential section 324A). Similarly, the second valve 320B may be configured to partially or completely block fuel flow, thereby maintaining adequate fuel pressure and/or flow within the portion of the second branch 318 between the fuel supply inlet interface 112 and the second valve 320B, with fuel only being delivered through the fuel delivery outlet interfaces 114 that are coupled along the portion of the second branch 318 between the bend 321 and the second valve 320B (i.e., the second fuel flow circumferential section 322B). The second valve 320B also limits or restricts the fuel pressure and/or flow within the portion of the second branch 318 between the second valve 320B and the second end portion 315 (i.e., the second fuel limited circumferential section 324B), according to various embodiments.

In various embodiments, the two fuel flow circumferential sections 322A, 322B are separated by the two fuel limited circumferential sections 324A, 324B, and vice versa. In other words, the fuel delivery outlet interfaces 114, or at least groupings thereof, alternate between being coupled to one of the two fuel flow circumferential sections 322A, 322B (and thus have adequate fuel to maintain combustion burn and prevent lean blowout) and one of the two fuel limited circumferential sections 324A, 324B, according to various embodiments.

In various embodiments, a first fuel delivery outlet interface 114A, or a first grouping of adjacent fuel delivery outlet interfaces, may be coupled to and disposed along a first quadrant (e.g., 322A) of the fuel manifold. A second fuel delivery outlet interface 114B, or a second grouping of adjacent fuel delivery outlet interfaces, may be coupled to and disposed along a second quadrant (e.g., 324A) of the fuel manifold that is circumferentially adjacent the first quadrant. A third fuel delivery outlet interface 114C, or a third grouping of adjacent fuel delivery outlet interfaces, may be coupled to and disposed along a third quadrant (e.g., 322B) of the fuel manifold that is circumferentially adjacent the second quadrant. A fourth fuel delivery outlet interface 114D, or a fourth grouping of adjacent fuel delivery outlet interfaces, may be coupled to and disposed along a fourth quadrant (e.g., 324B) of the fuel manifold that is circumferentially adjacent the third quadrant and the first quadrant. In various embodiments, one or more valves, such as valves 320A and 320B, are actively controllable, in response to a change in requested the engine operating line, to allow adequate fuel pressure to the first and third quadrants of the fuel manifold while restricting or limiting the fuel pressure to the second and fourth quadrants of the fuel manifold. Such a configuration generally distributes adequate fuel pressure to opposing quadrants of the fuel manifold 310, thereby not only preventing lean blowout but also preventing detrimental tangential acoustics.

The term "detrimental tangential acoustics" may refer to thermoacoustic instabilities and/or oscillatory phenomena that are observable in combustion systems. Detrimental tangential acoustics in gas-turbine combustion chambers typically would arise when the combustion process results in localized, unsteady heat release in response to, for example, sudden changes in the requested engine operating line. By actuating the valves 320A, 320B in response to such changes in the requested engine operating line (e.g., snap decel), the fuel can be distributed in opposing quadrants, as shown in FIG. 6, thereby inhibiting detrimental tangential acoustics. Accordingly, the present disclosure provides a system for generally suppressing thermoacoustic instabilities to increase gas turbine engine performance and improve engine life. In various embodiments, the present disclosure also provides a system for enriching the fuel-air ratio around one or more igniters to facilitate ignition.

Figure 7:
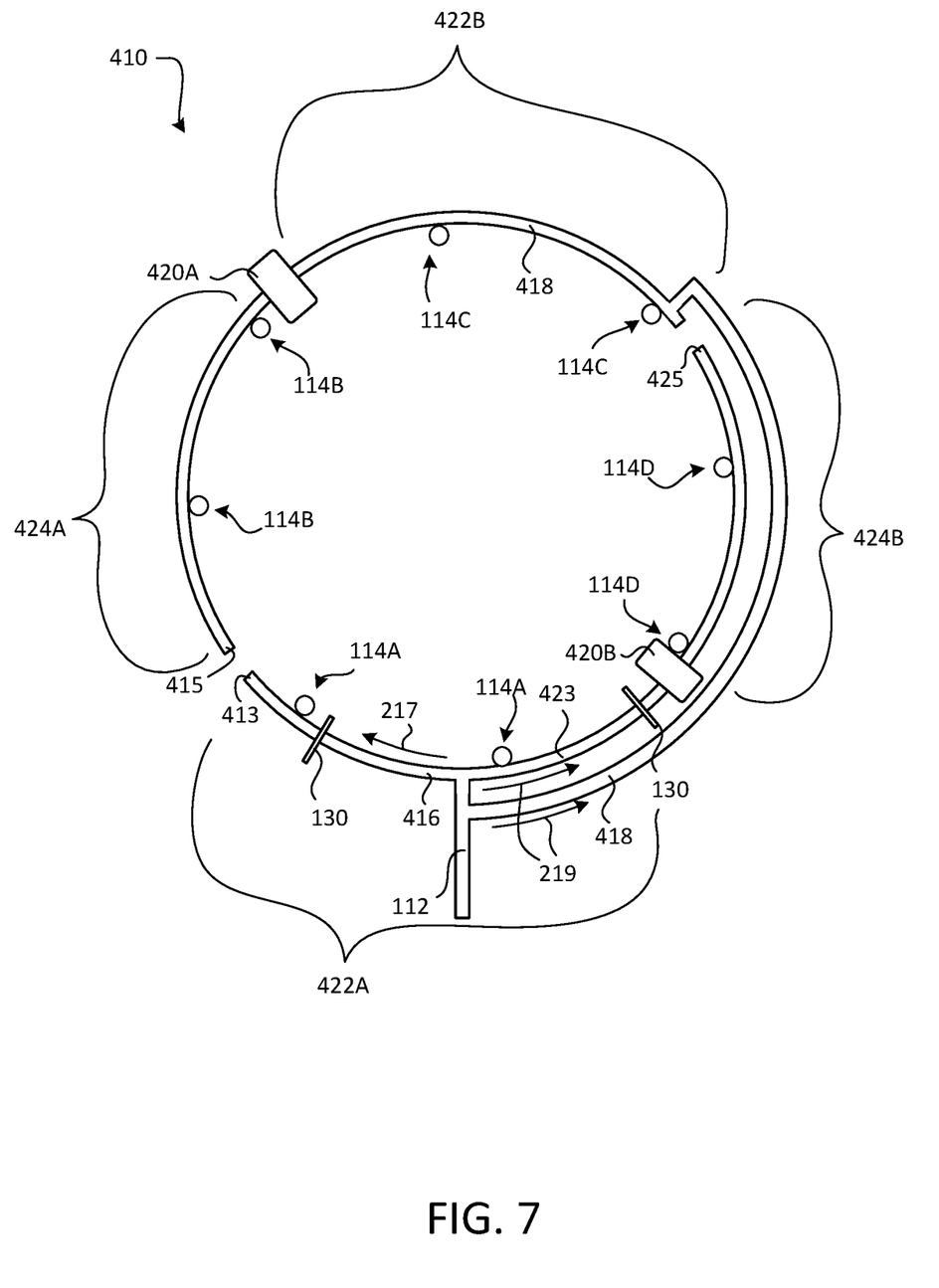

In various embodiments, and with reference to FIG. 7, an alternative "quadrant" configuration is provided for the fuel manifold 410 is provided. The fuel manifold 410 may include a first branch 416 that extends in the first circumferential direction 217 from the fuel supply inlet interface 112, a second branch 418 that extends in the second circumferential direction 219 from the fuel supply inlet interface 112, and a third branch 423 that extends in the second circumferential direction 219 from the fuel supply inlet interface 112. The first valve 420A and the second valve 420B may be configured to divide the fuel manifold 410 into a first fuel flow circumferential section 422A, a second fuel flow circumferential section 422B, a first fuel limited circumferential section 424A, and a second fuel limited circumferential section 424B, as shown.

Figure 8:
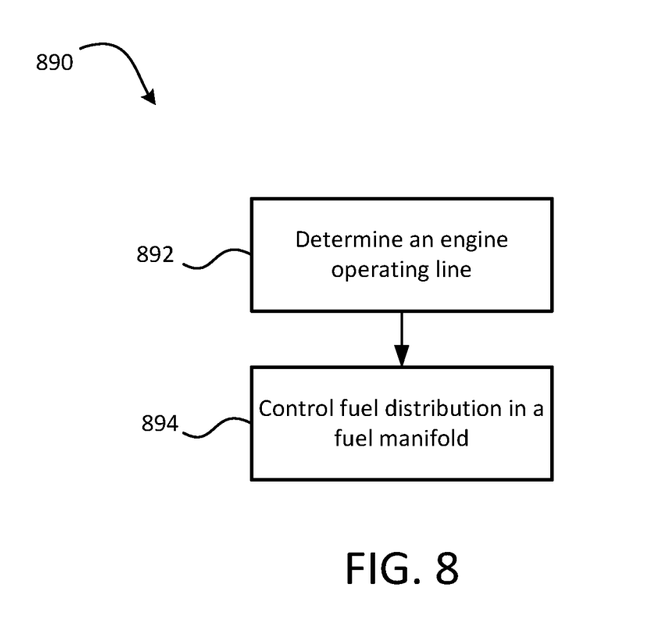
FIG. 8 is a schematic flowchart diagram of a method of controlling a gas turbine engine, in accordance with various embodiments.

In various embodiments, and with reference to FIG. 8, a method 890 of controlling a gas turbine engine is provided. The method 890 includes determining an engine operating line at step 892 and controlling fuel distribution in a fuel manifold at step 894, according to various embodiments. Determining the engine operating line (step 892) may be performed by a controller, such as the engine electronic controller described above. The engine operating line may refer to an operating condition requested by a user, such as a pilot Controlling fuel distribution in the fuel manifold (step 894) may also be performed by the controller and may be performed using at least one valve that is coupled to the fuel manifold.

In various embodiments, controlling fuel distribution in the fuel manifold (step 894) includes dividing, by the controller and via the at least one valve, the fuel manifold into at least one fuel flow circumferential section and at least one fuel limited circumferential section. Step 894, according to various embodiments, includes dividing the fuel manifold into two fuel flow circumferential sections and two fuel limited circumferential sections. In various embodiments, controlling the fuel distribution includes controlling a position of a stem of the valve.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
   a fuel manifold comprising a first branch and a second branch, wherein the fuel manifold extends circumferentially around a diffuser case of the gas turbine engine, the fuel manifold comprising a fuel supply inlet interface for receiving fuel into the fuel manifold and a plurality of fuel delivery outlet interfaces for delivering fuel to a combustor of the gas turbine engine;
   a first valve coupled to the first branch of the fuel manifold and disposed between two adjacent fuel delivery outlet interfaces of the plurality of fuel delivery outlet interfaces; and
   a second valve coupled to the second branch of the fuel manifold;
   wherein the first valve and the second valve are configured to control fuel distribution in the fuel manifold and to divide the fuel manifold into two fuel flow circumferential sections and two fuel limited circumferential sections.

2. The gas turbine engine of claim 1, wherein the first valve is configured to at least decrease fuel flow to one of the plurality of fuel delivery outlet interfaces.

3. The gas turbine engine of claim 1, wherein the first valve is configured to at least decrease fuel flow to a portion of the plurality of fuel delivery outlet interfaces.

4. The gas turbine engine of claim 1, further comprising an igniter coupled in ignition providing communication with the combustor, wherein the igniter is circumferentially positioned adjacent to the at least one of the fuel flow circumferential sections of the fuel manifold.

5. The gas turbine engine of claim 1, wherein the first branch extends in a first circumferential direction from the fuel supply inlet interface and terminates at a first end portion and the second branch extends a second circumferential direction from the fuel supply inlet interface and terminates at a second end portion.

6. The gas turbine engine of claim 1, wherein the second branch of the fuel manifold comprises a bend, wherein the second branch extends in the first circumferential direction from the bend.

7. The gas turbine engine of claim 1, wherein the two fuel flow circumferential sections are separated by the two fuel limited circumferential sections, and vice versa.

8. The gas turbine engine of claim 1, wherein the valve is actively controlled by an engine electrical control unit.

9. A gas turbine engine comprising:
   a combustor;
   an igniter coupled in ignition providing communication with the combustor;
   a fuel manifold comprising a fuel supply inlet interface for receiving fuel into the fuel manifold and a plurality of fuel delivery outlet interfaces for delivering fuel to the combustor of the gas turbine engine, wherein the fuel manifold comprises a first branch extending in a first circumferential direction from the fuel supply inlet interface and terminating at a first end portion and a second branch extending a second circumferential direction from the fuel supply inlet interface and terminating at a second end portion, wherein the second branch of the fuel manifold comprises a bend, wherein the second branch extends in the first circumferential direction from the bend;
   a first valve coupled to the first branch of the fuel manifold; and
   a second valve coupled to the second branch of the fuel manifold;
   wherein the first valve and the second valve are configured to divide the fuel manifold into two fuel flow circumferential sections and two fuel limited circumferential sections.

10. The gas turbine engine of claim 9, wherein the two fuel flow circumferential sections are separated by the two fuel limited circumferential sections, and vice versa.

11. A method of controlling a gas turbine engine, the method comprising:
- determining, by a controller, an engine operating line of the gas turbine engine;
- controlling, by the controller and via at least one valve coupled to a fuel manifold, fuel distribution in the fuel manifold, wherein controlling fuel distribution in the fuel manifold comprises dividing, by the controller and via the at least one valve, the fuel manifold into at least one fuel flow circumferential section and at least one fuel limited circumferential section.

12. The method of claim 11, wherein controlling fuel distribution in the fuel manifold comprises dividing, by the controller and via the at least one valve, the fuel manifold into two fuel flow circumferential sections and two fuel limited circumferential sections.

13. The method of claim 11, wherein controlling fuel distribution via the at least one valve comprises controlling a position of a stem of the valve.

\* \* \* \* \*